July 30, 1929.  C. S. GLENNY  1,722,416
WIRE BASKET
Filed Dec. 2, 1927
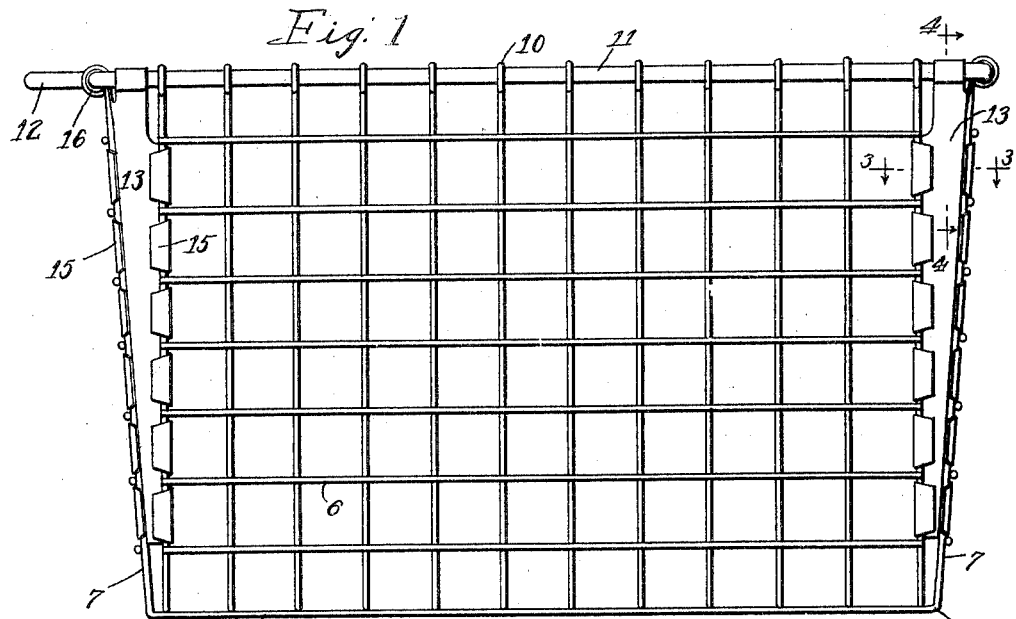
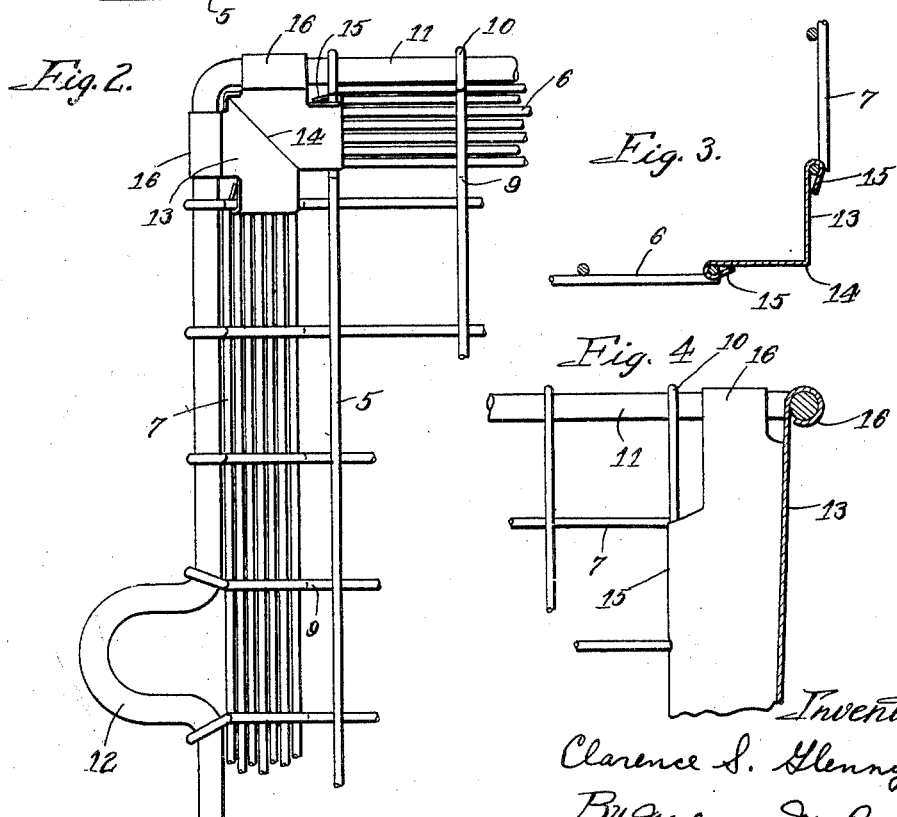
Inventor:
Clarence S. Glenny
By Wilson & McCanna
Attys.

Patented July 30, 1929.

1,722,416

UNITED STATES PATENT OFFICE.

CLARENCE S. GLENNY, OF ROCKFORD, ILLINOIS, ASSIGNOR TO THE WASHBURN COMPANY, OF WORCESTER, MASSACHUSETTS, A CORPORATION OF MASSACHUSETTS.

WIRE BASKET.

Application filed December 2, 1927. Serial No. 237,162.

This invention relates to the manufacture of wire baskets and similar receptacles.

The principle object is to provide a basket of sturdier and more rigid construction without increase in cost.

According to my invention, the corners of the basket are formed by sheet metal ribs of angular cross section joined to the wires of the side walls and to the heavy wire of the top frame of the basket with the result that the basket is greatly reinforced and will withstand the worst abuse without crushing or getting out of shape.

The invention is hereinafter described by reference to the accompanying drawing in which—

Figure 1 is a side view of a locker basket of my improved construction;

Fig. 2 is a plan view of one corner and a part of one end of the basket on a slightly enlarged scale; and Figs. 3 and 4 are horizontal and vertical sections, respectively, taken on the lines 3—3 and 4—4 of Fig. 1 looking in the direction of the arrows.

The same reference numerals are applied to corresponding parts throughout the views.

As just indicated, the invention is shown embodied in a locker basket such as are familiar to those frequenting gymnasiums. These baskets receive rough treatment and when of unreinforced construction soon fall apart or are rendered unfit for further use. Furthermore, when not constructed to prevent the spreading apart of the wires such baskets are apt to be broken into and the contents pilfered. The basket constructed in accordance with my invention, as will hereinafter appear, is reenforced to meet service requirements and is, furthermore, so designed and constructed as to discourage breaking into the same. While the invention is disclosed as embodied in a basket of the type referred to, it should be understood that no limitation on the use of the invention is to be thereby implied, nor for that matter is the invention particularly limited to use in a basket construction but might be utilized to advantage in making wire trays and other receptacles, or for other purposes.

The basket illustrated has the bottom, sides, and end walls 5, 6, and 7, respectively, formed from a single piece of wire netting or cloth wherein the wires, wherever they cross one another, are suitably electrically welded to prevent the likelihood of their being spread apart in an attempt to break into the basket when the same is in its compartment on the rack in a locker room. The welding obviously also makes for greater strength and is one factor which accounts for the basket holding its shape. The wires of the side and end walls 6 and 7 are bent upwardly, as indicated at 9, and the free ends are clinched, as shown at 10, to a heavy wire top frame 11. The latter is suitably formed from a single length of wire, the free ends of which are butt-welded, and an eyelet 12 is formed in said wire to be used both as a finger-hold in pulling the basket out of its compartment in the rack and in the locking of the basket to the rack. It will be observed that the side and end walls 6 and 7 are slightly inclined in extending from the bottom 5 of smaller dimensions to the top of the basket which is of slightly larger dimensions. This tapering in form is for the purpose of enabling the nesting of the baskets which, of course, is of advantage in shipping and is also of advantage in the stacking of the baskets in the locker room when not in use. The construction of the basket as thus far described is not claimed as new but contributes toward my invention in the ways hereinafter set forth.

According to my invention the corners of the basket are completed by the use of one-piece sheet metal ribs 13 bent along a longitudinal median line, as indicated at 14, to approximately right angular cross-section (see Fig. 3). The edges of these corner pieces are stamped to form lugs 15 spaced according to the mesh of the wire netting of which the basket is made, these lugs being arranged to be bent around and clinched on the upright wires at the ends of the side and end walls 6 and 7, as clearly appears in Figs. 1 to 3, so as to join these walls in a very secure and permanent fashion. It is preferred to have the lugs 15 bent outwardly so as to leave the inside of the basket entirely devoid of any projections which might tend to catch onto things placed in the basket and might also result in injury by cutting or scratching the hands of the user, but I prefer not to limit myself to this specific construction. The corner pieces 13 are also suitably joined to the top frame 11 by the looping and clinching onto said frame of lugs 16 provided at the upper ends of said corner pieces. Thus, it will appear that I have not only provided for the secure and permanent joining of the side and end walls of the basket at the corners thereof, but have also reenforced the connection of said walls with the top frame. As a result of such reenforced construction, and partly also because of the welding of the cross-wires, the basket will withstand the worst abuse and will seldom, if ever, get out of shape, nor can it be crushed. The construction, besides being sturdy and durable, is also neat and pleasing in appearance and is just as cheap to make as the weaker and less satisfactory baskets of heretofore.

I claim:

1. In a wire basket comprising a bottom, and upwardly diverging side and end walls, a wire frame defining the top of said basket, and sheet metal corner pieces angular in cross-section and narrowing from top to bottom to fill in the corners of said basket, the flanges of said pieces having lugs formed on the lateral edges thereof clinching about the wires at the adjoining ends of the side and end walls and having at the upper ends thereof lugs clinching about the wire top frame.

2. In a wire basket comprising bottom, side, and end walls formed by a single piece of wire netting of square mesh, the side and end walls being formed by sections bent upwardly from a central section forming the bottom wall, the longitudinal wires of said netting forming the upright wires in the end walls and the transverse wires of said netting forming the upright wires in the side walls, a wire frame defining the top of said basket having the aforesaid upright wires of the end and side walls clinched thereto, and sheet metal corner pieces angular in cross-section so as to fill the corners of said basket between the upright wires at adjoining ends of the end and side walls of said basket, said corner pieces having a plurality of lugs formed on the lateral edges thereof spaced so as to fit between the horizontal wires of the side and end walls, said lugs being clinched about the upright wires at the adjoining ends of said end and side walls, and said corner pieces having lugs on the upper ends thereof clinching about the wire top frame.

3. In a wire basket comprising a bottom, and upwardly diverging side and end walls, there being preferably a wire frame defining the top of said basket, and sheet metal corner pieces angular in cross-section and narrowing from top to bottom to fill in the corners of said basket, the flanges of said pieces having lugs formed on the lateral edges thereof clinching about the wires at the adjoining ends of the side and end walls.

4. In a wire basket comprising bottom, side, and end walls formed by a single piece of wire netting of square mesh, the side and end walls being formed by sections bent upwardly from a central section forming the bottom wall, the longitudinal wires of said netting forming the upright wires in the end walls and the transverse wires of said netting forming the upright wires in the side walls, a wire frame defining the top of said basket having the aforesaid upright wires of the end and side walls clinched thereto, and sheet metal corner pieces angular in cross-section so as to fill the corners of said basket between the upright wires at adjoining ends of the end and side walls of said basket, said corner pieces having a plurality of lugs formed on the lateral edges thereof spaced so as to fit between the horizontal wires of the side and end walls, said lugs being clinched about the upright wires at the adjoining ends of said end and side walls.

In witness of the foregoing I affix my signature.

CLARENCE S. GLENNY.